United States Patent
Christy

(10) Patent No.: US 6,366,911 B1
(45) Date of Patent: Apr. 2, 2002

(54) PARTITIONING OF SORTED LISTS (CONTAINING DUPLICATE ENTRIES) FOR MULTIPROCESSORS SORT AND MERGE

(75) Inventor: Dan Allan Christy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/161,788

(22) Filed: Sep. 28, 1998

(51) Int. Cl.$^7$ .............................................. G06F 17/30
(52) U.S. Cl. ........................................................ 707/7
(58) Field of Search ................................ 707/1–7, 101, 707/102, 200, 205

(56) References Cited

U.S. PATENT DOCUMENTS

| | | | | |
|---|---|---|---|---|
| 5,179,699 A | * | 1/1993 | Iyer et al. ....................... | 707/7 |
| 5,307,485 A | * | 4/1994 | Bordonaro et al. ............. | 707/7 |
| 5,440,736 A | * | 8/1995 | Lawson, Jr. .................... | 707/7 |
| 5,845,113 A | * | 12/1998 | Swami et al. .................. | 707/7 |
| 5,852,826 A | * | 12/1998 | Graunke et al. ................ | 707/7 |

* cited by examiner

Primary Examiner—Hosain T. Alam
Assistant Examiner—Alford W. Kindred
(74) Attorney, Agent, or Firm—Schmeiser, Olsen & Watts; S. Jared Pitts

(57) ABSTRACT

According to a preferred embodiment, a method of sorting a list of elements with duplicate entries using multiple processors is disclosed. Using "P" processors, a list of elements is split into P lists and each processor pre-sorts a list. All pre-sorted lists are lined up to form a partitioning table, with each pre-sorted list making up a column in the table, and the first element from each pre-sorted list making up the first row in the table, and the second element from each pre-sorted list making up the second row, etc. P–1 partition boundary lines are drawn through the partition table to create P equally sized partitions. Each partition boundary line is drawn such that every element below the line has a value larger than any element above the line, and every element above the line has a value smaller than any element below the line. Duplicate elements are uniquely "weighted" during the partitioning process. Thus, with respect to duplicate elements, each partition boundary lines is drawn such that every duplicate element below the line weighs more than any duplicate element above the line, and every duplicate element above the line weighs less than any duplicate element below the line. In this manner, tabularized pre-sorted lists are grouped into P partitions, which are merged and re-sorted into P sorted lists. Finally, the P sorted lists are simply strung together to provide a sorted list of all elements. Maximum use of P processors is obtained, and a near linear improvement in sort time is obtained when adding further processors.

34 Claims, 12 Drawing Sheets

| ROW | CPU 1 | CPU 2 | CPU 3 | CPU 4 |
|---|---|---|---|---|
| 1 | 2 | 2 | 2 | 2 |
| 2 | 2 | 2 | 2 | 2 |
| 3 | 2 | 2 | 2 | 2 |
| 4 | 2 | 2 | 2 | 4 |
| 5 | 2 | 4 | | |
| 6 | 2 | 4 | | |
| 7 | 2 | 4 | | |
| 8 | 4 | 4 | | |
| 9 | 4 | | | |

FIG. 7

| ROW | LIST 1 | LIST 2 | LIST 3 | LIST 4 |
|---|---|---|---|---|
| 1 | 2 | 2 | 2 | 2 |
| 2 | 2 | 2 | 2 | 2 |
| 3 | 2 | 2 | 2 | 2 |
| 4 | 2 | 2 | 2 | 4 |
| 5 | 2 | 4 | | |
| 6 | 2 | 4 | | |
| 7 | 2 | 4 | | |
| 8 | 4 | 4 | | |
| 9 | 4 | | | |

FIG. 8

| ROW | LIST 1 | LIST 2 | LIST 3 | LIST 4 |
|---|---|---|---|---|
| 2 | 2 | 2 | 2 | 2 |
| 4 | 2 | 2 | 2 | 4 |
| 6 | 2 | 4 | | |
| 8 | 4 | 4 | | |

| ROW | LIST 1 | LIST 2 | LIST 3 | LIST 4 |
|---|---|---|---|---|
| 2 | 2 | 2 | 2 | 2 |
| 4 | 2 | 2 | 2 | 4 |
| 6 | 2 | 4 | | |
| 8 | 4 | 4 | | |

| ROW | LIST 1 | LIST 2 | LIST 3 | LIST 4 |
|---|---|---|---|---|
| 1 | 2 | 2 | 2 | 2 |
| 2 | 2 | 2 | 2 | 2 |
| 3 | 2 | 2 | 2 | 2 |
| 4 | 2 | 2 | 2 | 4 |
| 5 | 2 | 4 | | |
| 6 | 2 | 4 | | |
| 7 | 2 | 4 | | |
| 8 | 4 | 4 | | |
| 9 | 4 | | | |

| ROW | LIST 1 | LIST 2 | LIST 3 | LIST 4 |
|---|---|---|---|---|
| 1 | 2 | 2 | 2 | 2 |
| 2 | 2 | 2 | 2 | 2 |
| 3 | 2 | 2 | 2 | 2 |
| 4 | 2 | 2 | 2 | 4 |
| 5 | 2 | 4 | | |
| 6 | 2 | 4 | | |
| 7 | 2 | 4 | | |
| 8 | 4 | 4 | | |
| 9 | 4 | | | |

| ROW | LIST 1 | LIST 2 | LIST 3 | LIST 4 |
|---|---|---|---|---|
|     |        |        |        |        | ← 910
| 4   | 2      | 2      | 2      | 4      |
| 8   | 4      | 4      |        |        |

FIG. 17

| ROW | LIST 1 | LIST 2 | LIST 3 | LIST 4 |
|---|---|---|---|---|
|     |        |        |        |        | ← 1810
| 4   | 2      | 2      | 2      | 4      |
| 8   | 4      | 4      |        |        |

FIG. 18

| ROW | LIST 1 | LIST 2 | LIST 3 | LIST 4 |
|---|---|---|---|---|
|     |        |        |        |        | ← 1810
| 2   | 2      | 2      | 2      | 2      |
| 4   | 2      | 2      | 2      | 4      |
| 6   | 2      | 4      |        |        |
| 8   | 4      | 4      |        |        |

FIG. 19

| ROW | LIST 1 | LIST 2 | LIST 3 | LIST 4 |
|---|---|---|---|---|
| 2 | 2 | 2 | 2 | 2 |
| 4 | 2 | 2 | 2 | 4 |
| 6 | 2 | 4 | | |
| 8 | 4 | 4 | | |

FIG. 20

| ROW | LIST 1 | LIST 2 | LIST 3 | LIST 4 |
|---|---|---|---|---|
| 1 | 2 | 2 | 2 | 2 |
| 2 | 2 | 2 | 2 | 2 |
| 3 | 2 | 2 | 2 | 2 |
| 4 | 2 | 2 | 2 | 4 |
| 5 | 2 | 4 | | |
| 6 | 2 | 4 | | |
| 7 | 2 | 4 | | |
| 8 | 4 | 4 | | |
| 9 | 4 | | | |

FIG. 21

PARTITIONING OF SORTED LISTS (CONTAINING DUPLICATE ENTRIES) FOR MULTIPROCESSORS SORT AND MERGE

BACKGROUND OF THE INVENTION

1. Technical Field

This invention generally relates to the use of multiple processors to merge sorted lists, and more specifically relates to the efficient partitioning of sorted lists containing duplicate entries making use of all the processors during the final sort and merge of the lists.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One way in which computers have become more powerful is in their ability to work synchronously in performing tasks. For instance, sorting large volumes of data into an order of ascending or descending values can be done faster when using multiple processors, or "multiprocessors," and has been the subject of much study. It is a relatively simple process to initially divide the list of N elements into P nearly equal sized lists for each of P processors to individually sort. Once these lists are sorted, they must be merged together into one list. It is desirable that the time required to perform this merge be linear with respect to the number of processors, (i.e. 2 processors yield twice the performance of 1 processor, 4 processors yield quadruple the performance of 1 processor). In other words, with N total elements to be merged using P processors, the time to merge should be proportional to N/P. This is where most of the prior art has run into difficulties. The time to merge using the most efficient prior art method is proportional to $N/P*\log_2 P$. To illustrate, consider what happens to merge performance as a computer system is upgraded from 2 to 4 processors. If the merge performance is linear then the merge time goes from N/2 to N/4 for a twofold performance increase. If the merge performance is $N/P*\log_2 P$ then the merge time goes from $N/2*\log_2 2 = N/2*1 = N/2$ to $N/4*\log_2 4 = N/4*2 = N/2$ for no performance increase even though two additional processors were used.

One reference, Akl, S. G., and Santroo, N., "Optimal Parallel Merging and Sorting Without Memory Conflicts" IEEE Trans. on Computers, Vol. C36, No. 11, November 1987, pp. 1367–69, describes a system that can work on two lists at a time, finding the value of the element where the sum of the number of elements in the two lists below the value is equal to the sum of the number of elements in the two lists above the value. It is then a simple matter to partition the two lists at that value, and one processor sort the combined lists below the partition, while the other processor sorts the combined lists above the partition. The two lists are then concatenated, or simply strung together to form one new list sorted in the correct order. If there are more than two lists, the process is done simultaneously for each pair of lists, then one is left with half the number of lists. These lists are partitioned again to generate two pairs of lists as above, but, since the number of lists to be merged is now only half the original quantity, each of the two pairs of lists must be partitioned yet another time so that enough pairs of lists are available to keep all the processors busy. A pair of lists is first partitioned in half and then each half is partitioned to yield a one-quarter and three-quarter partition so that each processor has a pair of lists to merge. This clearly is inefficient since multiple merge phases are necessary to generate the final sorted list. If it were possible to partition all the lists at once into P partitions such that each processor could perform only a single merge phase, then a significant performance increase would result and the desired sorted list would be generated by simple concatenation of the merged partitions. This has been attempted by partitioning based on sample sort keys.

Another reference, Quinn, M. J., "Parallel Sorting Algorithms for Tightly Coupled Multi-processors", Parallel Computing, 6, 1988, pp. 349–367., chooses partitioning key values from the first list to be merged such that these keys will partition the first list into P partitions. These keys are then used to partition the remaining lists as close as possible to the sample key values. This leads to a load imbalance among processors due to the approximated partitions and a corresponding degradation from linear merge performance. Furthermore, if the data in the lists is skewed from random distribution (a common occurrence in relational data base operations), then the resulting approximate partitions can be greatly differing in size thereby exacerbating the load imbalance problem. Even with randomly distributed data the literature indicates that no performance is gained beyond 10 processors when sorting 10,000 records. This is attributed to load imbalances from approximate partitioning.

The prior art has succeeded in efficiently partitioning any number of sorted lists, when the lists do not contain duplicate entries. U.S. Pat. No. 5,179,699, Iyer et al, Jan. 12, 1993 "Partitioning Of Sorted Lists For Multiprocessors Sort and Merge," teaches such a method. When given a large list to sort, the list is initially divided amongst available processors. Each processor sorts one of these lists. The sorted lists are then partitioned to create new lists such that each of the elements in the new lists have values no smaller than any of the elements in the partitions before it, nor larger than any of the elements in the partitions following it. The lists in each partition are then simply strung together to provide a sorted list of all the elements. Maximum use of processors is obtained, and hence a near linear improvement in sort time is obtained when adding further processors.

The Iyer method works fine when all of the elements in the sorted lists are unique. After the list to be sorted is divided between "x" processors and individually sorted by each one, "x−1" processors then runs a partitioning process to create "x−1" partition boundaries, or "x" partitions. Each processor performs the same partition process on the sorted lists. What differs amongst the processors is the percentage of elements that the processor assigns to the upper and lower partitions.

For instance, given 4 sorted lists, 3 partition boundaries are drawn to create 4 partitions. Three processors then create partition boundaries: the first assigns ¼ of the elements to the upper boundary and the rest to the lower; the second assigns ½ of the elements to the upper boundary and the rest to the lower; and the third pro cessor assigns ¾ of the elements to the upper boundary and the rest to the lower. In this way, the Iyer method creates 4 partitions which then can be concatenated together to produce one final sorted list.

The Iyer method works inconsistently if duplicate entries are contained in the sorted lists. Sometimes the method works, but there are cases where duplicate elements are inserted into more than one partitioned list. Essentially what happens is that the partition boundaries cross, and the elements where the partition boundaries cross are counted more than once. Crossing of boundaries occurs when the partitioning process running separately on each processor includes elements in more than one partition. For instance, the partition boundaries might be drawn such that both partitions 1 and 2 contain the 6th element in the first list.

Whether the Iyer method works to sort lists given duplicate entries depends upon the location of the duplicate entries and the number of duplicates. The reason boundaries sometimes cross is that the Iyer method handles duplicate elements as equals in the partition process. Without a means to differentiate between the duplicate entries, each processor performing the partitioning process may not draw boundaries across the duplicate entries in the same manner. Yet, duplicate entries in large sorted lists are commonplace for many applications today. Thus, there exists a need to provide an improved method to partition sorted lists containing duplicate entries, and a method that remains more efficient when adding further processors.

DISCLOSURE OF INVENTION

According to a preferred embodiment, a method of sorting a list of elements with duplicate entries using multiple processors is disclosed. Using "P" processors, a list of elements is split into P lists and each processor pre-sorts a list. All pre-sorted lists are lined up to form a partitioning table, with each pre-sorted list making up a column in the table, and the first element from each pre-sorted list making up the first row in the table, and the second element from each pre-sorted list making up the second row, etc.

P–1 partition boundary lines are drawn through the partition table to create P equally sized partitions. Each partition boundary line is drawn such that every element below the line has a value larger than any element above the line, and every element above the line has a value smaller than any element below the line. Duplicate elements are uniquely "weighted" during the partitioning process. Thus, with respect to duplicate elements, each partition boundary lines is drawn such that every duplicate element below the line weighs more than any duplicate element above the line, and every duplicate element above the line weighs less than any duplicate element below the line.

Each processor finds a different partition boundary. The first processor finds a boundary with 1/P elements above its partition line, the second finds a boundary with 2/P elements above its line, and so on. In this manner, tabularized pre-sorted lists are grouped into P partitions, which are merged and re-sorted into P sorted lists. Finally, the P sorted lists are simply strung together to provide a sorted list of all elements. Maximum use of P processors is obtained, and a near linear improvement in sort time is obtained when adding further processors. The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention are hereinafter described in conjunction with the appended drawings, where like designations denote like elements, and:

FIG. 7 is an example of four pre-sorted subset lists in accordance with the preferred embodiment;

FIG. 8 is an example of four partitions resulting from drawing three partition boundary lines through four pre-sorted subset lists according to the preferred embodiment;

FIG. 13 illustrates the addition of two more rows for consideration in the partitioning process according to the preferred embodiment;

FIG. 14 illustrates a redrawn partition boundary line upon considering the elements in the additional rows in accordance with the preferred embodiment;

FIG. 15 illustrates the addition of all remaining rows for consideration in the partitioning process in accordance with the preferred embodiment;

FIG. 16 illustrates the final partition boundary line in accordance with the preferred embodiment;

FIG. 17 illustrates an additional row under consideration by another processor performing the partitioning process according to the preferred embodiment;

FIG. 18 illustrates a redrawn partition boundary line upon considering the additional row in accordance with the preferred embodiment;

FIG. 19 illustrates two additional rows for consideration in the partitioning process according to the preferred embodiment;

FIG. 20 illustrates a redrawn partition boundary line upon consideration of additional rows in accordance with the preferred embodiment; and FIG. 21 illustrates the final partition boundary line upon considering all rows in the partitioning table according to the preferred embodiment.

BEST MODE FOR CARRYING OUT THE INVENTION

Generally, the process of using any number of multiple processors, "P," to sort a list of elements that contains duplicate entries first involves dividing up the list of elements amongst the P processors and each processor pre-sorts a portion of the list of elements. All the pre-sorted subset lists are then lined up to form a partitioning table, where each column of the table consists of one of the pre-sorted subset lists, and the first element from each pre-sorted list making up the first row in the table, and the second element from each pre-sorted list making up the second row, etc.

Next, the partitioning table is divided into P partitions by "P–1" processors, each processor drawing one partition boundary line. Each processor performs the same partition procedure; however, the percentage of elements that each processor assigns above and below its partition boundary line differs. For instance, the first processor draws a partition boundary line with 1/P elements in its upper partition. The second processor draws a partition boundary line with 2/P elements in its upper partition.

The partition boundary lines are drawn such that each element in one partition has a value no smaller than any element in the partitions before it, nor a value larger than any element in the partitions following it. In the case of duplicate values, the row and column positioning of the duplicate value determines a weighting of the value which allows the partition boundary lines to be drawn such that each duplicate value in one partition weighs more than any element in the partition before it, and weighs less than any element in the partition following it.

Once the partition boundary lines are determined, one partition is merged and sorted by each of the P processors. The merged and sorted partitions can then be concatenated together to provide a sorted list of elements. Maximum use of processors is obtained, and hence a near linear improvement in sort time is obtained when adding further processors. The methods of the present invention are now described in more detail.

Figure 1:
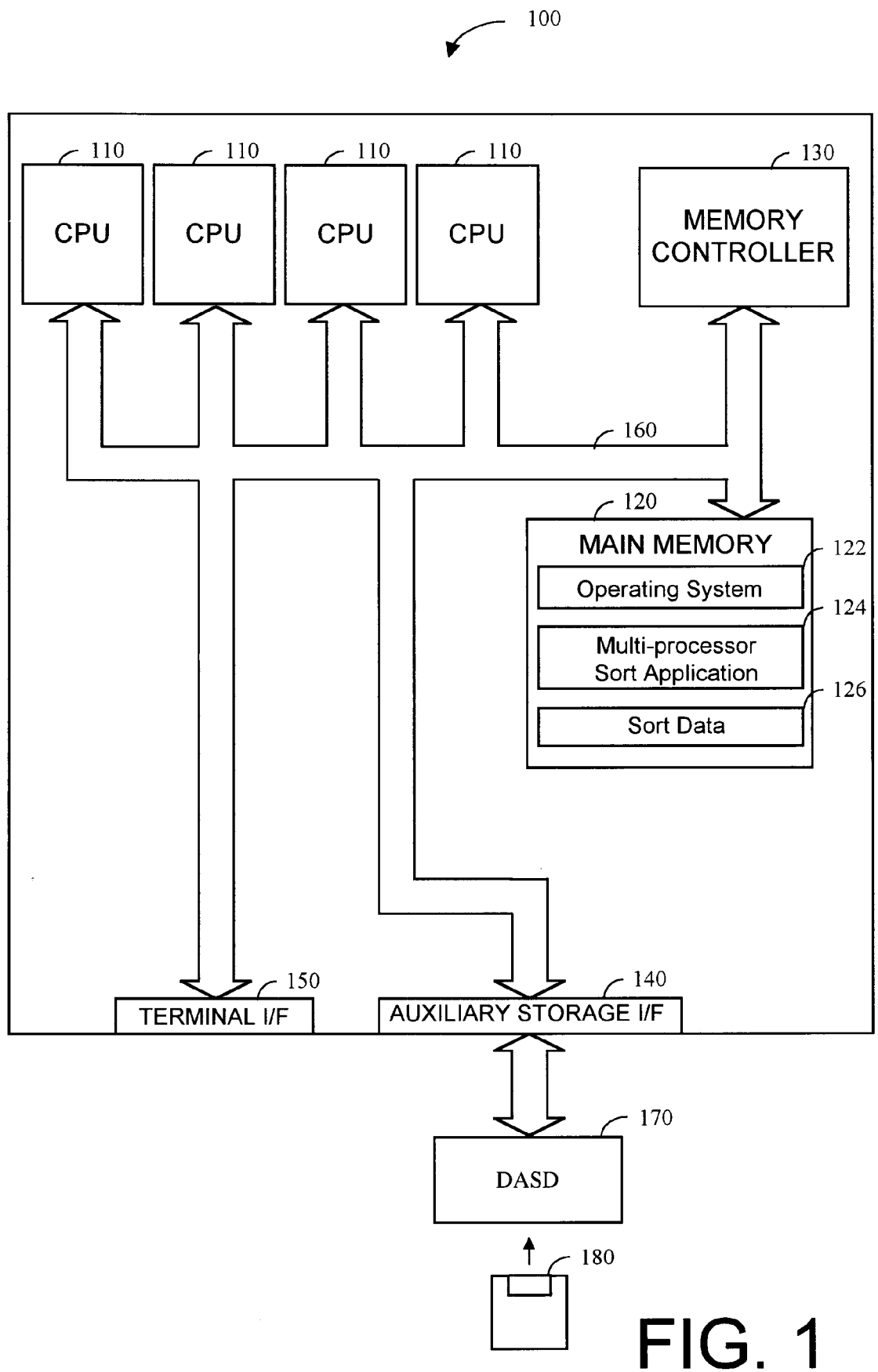
FIG. 1 is a schematic block diagram of a computer system in accordance with a preferred embodiment.

Referring now to FIG. 1, a computer-based system 100 in accordance with the preferred embodiment of the present invention includes an IBM AS/400 or other compatible computer. However, those skilled in the art will appreciate that the methods and apparatus of the present invention apply equally to any computer system which can take advantage of the method of partitioning several sorted lists. Computer system 100 suitably comprises a plurality of central processing units (CPU's) 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. Those skilled in the art will recognize that there are many possible computer systems which are suitable for use with the present invention.

Each processor 110 performs computation and control functions of computer system 100, and comprises a suitable central processing unit (CPU). Each processor 110 may comprise a single integrated circuit, such as a microprocessor, or may comprise any suitable number of integrated circuit devices and circuit boards working in cooperation to accomplish the functions of a processor. Each processor 110 suitably executes within main memory 120 a multiprocessor sort application 124, which allows multiple processors to act synchronously to sort data 126.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single system bus 160, it should be understood that the present invention applies equally to computer systems having multiple system buses. Similarly, although the system bus 160 of the preferred embodiment is a typical hardwired, multidrop bus, any connection means that supports bi-directional communication in a computer-related environment could be used.

It will be recognized that the invention is not dependent on one particular arrangement, and that other parallel processor architectures are also well suited to implement the present invention. Loosely coupled processors, each having its own separate main memory, or a series of main memories with caches, are also candidates for implementation of the present invention.

Figure 2:
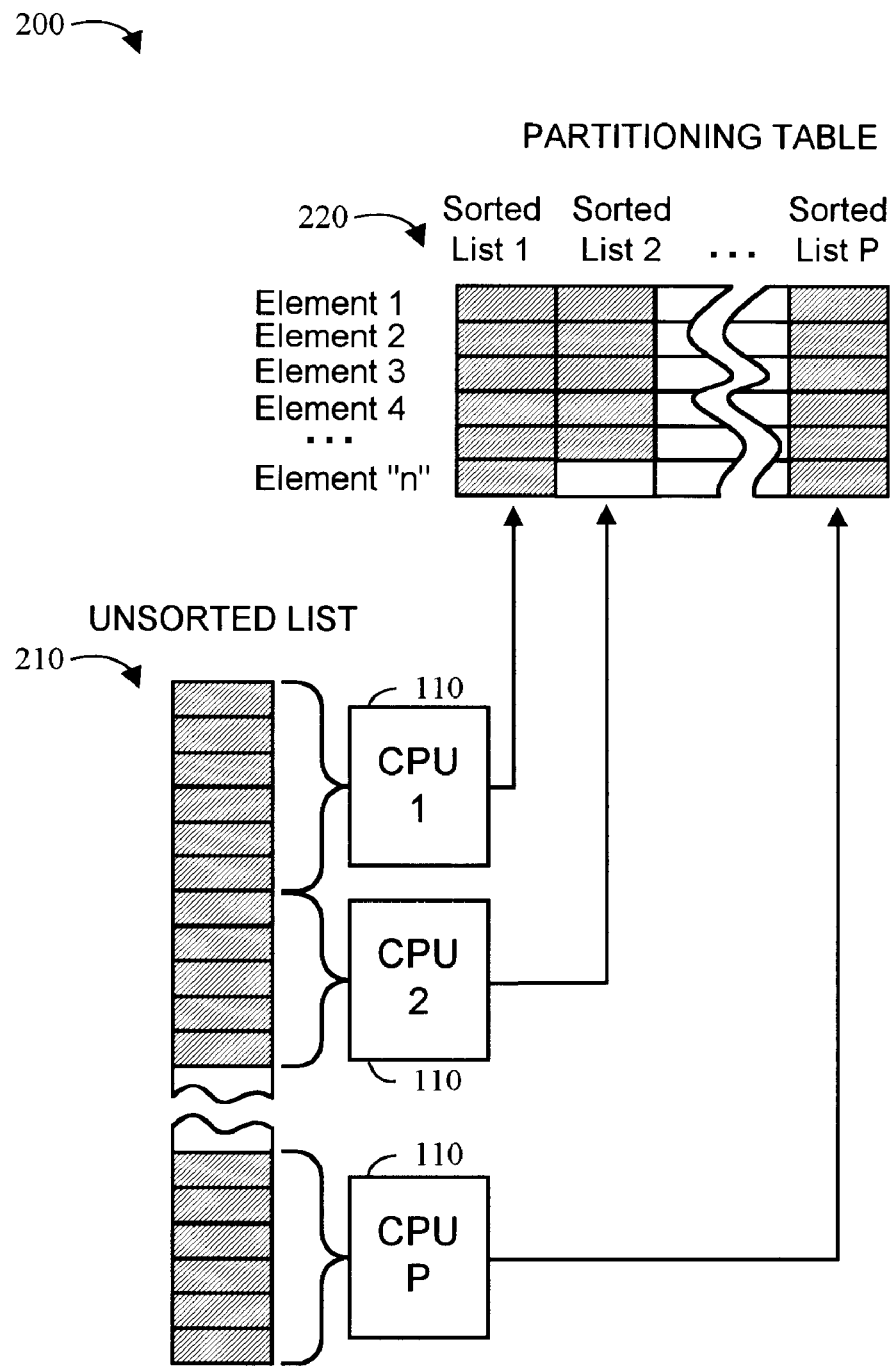
FIG. 2 is a diagram illustrating the creation of a partitioning table according to a preferred embodiment.

Referring now to FIG. 2, a diagram 200 depicting the creation of a partitioning table according to a preferred embodiment is illustrated. When sorting a large list 210 using "P" processors 110, the goal is to perform the sort in the shortest period of time. This is best accomplished by dividing unsorted list 210 as equally as possible between P processors 110. However, the methods of the present invention work even if unsorted list 210 is unequally divided amongst available processors. For instance, in diagram 200, unsorted list 210 is not divided equally amongst the P processors. Unsorted list 210 is divided such that CPU 1 and CPU P are assigned "n" elements, whereas CPU 2 is assigned "n–1" elements. Therefore, if the available processors are not identical with respect to processing speed, it may be desirable to split the load so as to make maximum use of each of the available processors.

Once unsorted list 210 is divided amongst P processors 110, each processor pre-sorts the elements assigned to it. The pre-sorted lists of elements are then lined up to form partitioning table 220. Each column of partitioning table 220 is one of the pre-sorted lists and each row of partitioning table 220 is "$n^{th}$" element in each of the pre-sorted lists. For instance, the pre-sorted subset of elements sorted by CPU 1 becomes the first column in partitioning table 220, the pre-sorted subset of elements sorted by CPU 2 becomes the second column in partitioning table 220, etc. It should be noted that not all columns have "n" rows. When a column such as sorted list 2 has fewer than "n" elements, the table entries are empty, as indicated by the unshaded box in list 2, row "n."

Figure 3:
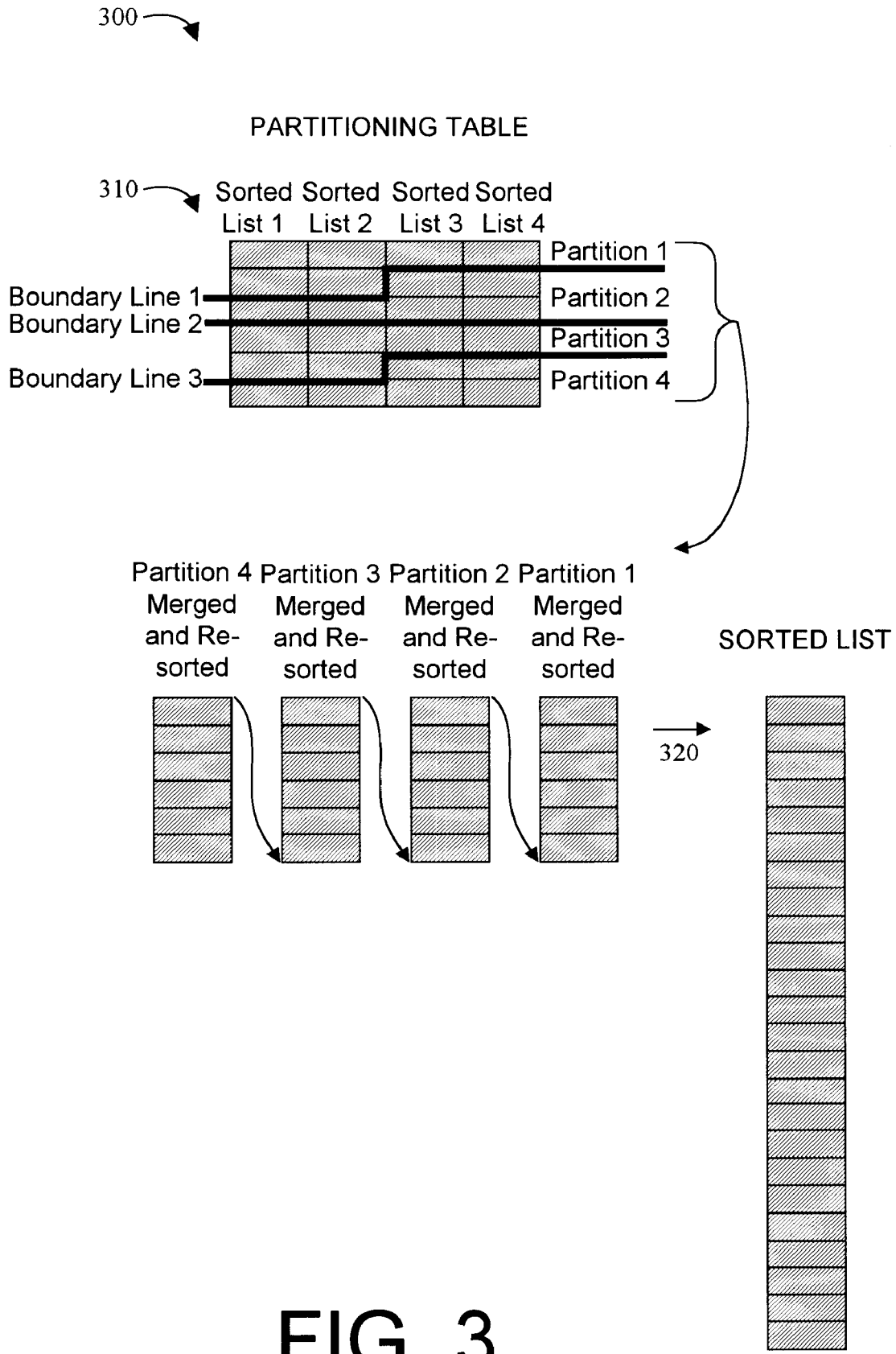
FIG. 3 is a diagram illustrating 3 partition boundary lines that create 4 partitions in a partitioning table according to the preferred embodiment.

Referring now to FIG. 3, diagram 300 depicting 3 partition boundary lines that create 4 partitions in a partitioning table is illustrated. Once all the pre-sorted lists have been lined up to a form partitioning table, each of "P−1" processors draws a partition boundary line to create P almost equally sized partitions from the partitioning table. In diagram 300, P, the number of processors equals 4. Partition table 310 has 4 columns, each which comprise one of the pre-sorted subset lists of elements. The greatest number of elements contained by any one of the pre-sorted subset lists is 6, so there are 6 rows in partitioning table 310. All of the pre-sorted subset lists in partition table 310 have 6 elements, so partition table 310 contains 24 elements total.

In the methods of the present invention, "P−1" processors draws a partition boundary line through the partitioning table to create P almost equally-sized partitions. Since P equals 4 in diagram 300, 3 of the 4 available processors draw a partition boundary line to create 4 almost equally-sized partitions. The partitions are created such that every element below a partition boundary line has a value larger than any element above the line, and every element above the line has a value smaller than any element below the line. Duplicate elements are uniquely "weighted" during the partitioning process. Thus, with respect to duplicate elements, each partition boundary lines is drawn such that every duplicate element below the line weighs more than any duplicate element above the line, and every duplicate element above the line weighs less than any duplicate element below the line.

Using partitioning table 310 as an example, partition boundary line 1 has been drawn such that every element in partition 2 has a value larger than any element in partition 1, and every element in partition 1 has a value smaller than any element in partition 2. With respect to duplicate elements, partition boundary line 1 is drawn such that every duplicate element in partition 2 weighs more than any duplicate element in partition 1, and every duplicate element in partition 1 weighs less than any duplicate in partition 1. Partition boundary lines 2 and 3 are drawn in the same manner.

After P partitions are created, each of the P processors merges one of the partitions and re-sorts the element within that partition. The merged and re-sorted partitions can then be concatenated to create a final sorted lists. In diagram 300, each of the 4 processors merges and re-sorts one partition. The 4 merged and re-sorted partitions are then concatenated to form sorted list 320. Maximum use of P processors is obtained, and a near linear improvement in sort time is obtained when adding further processors.

Figure 4:
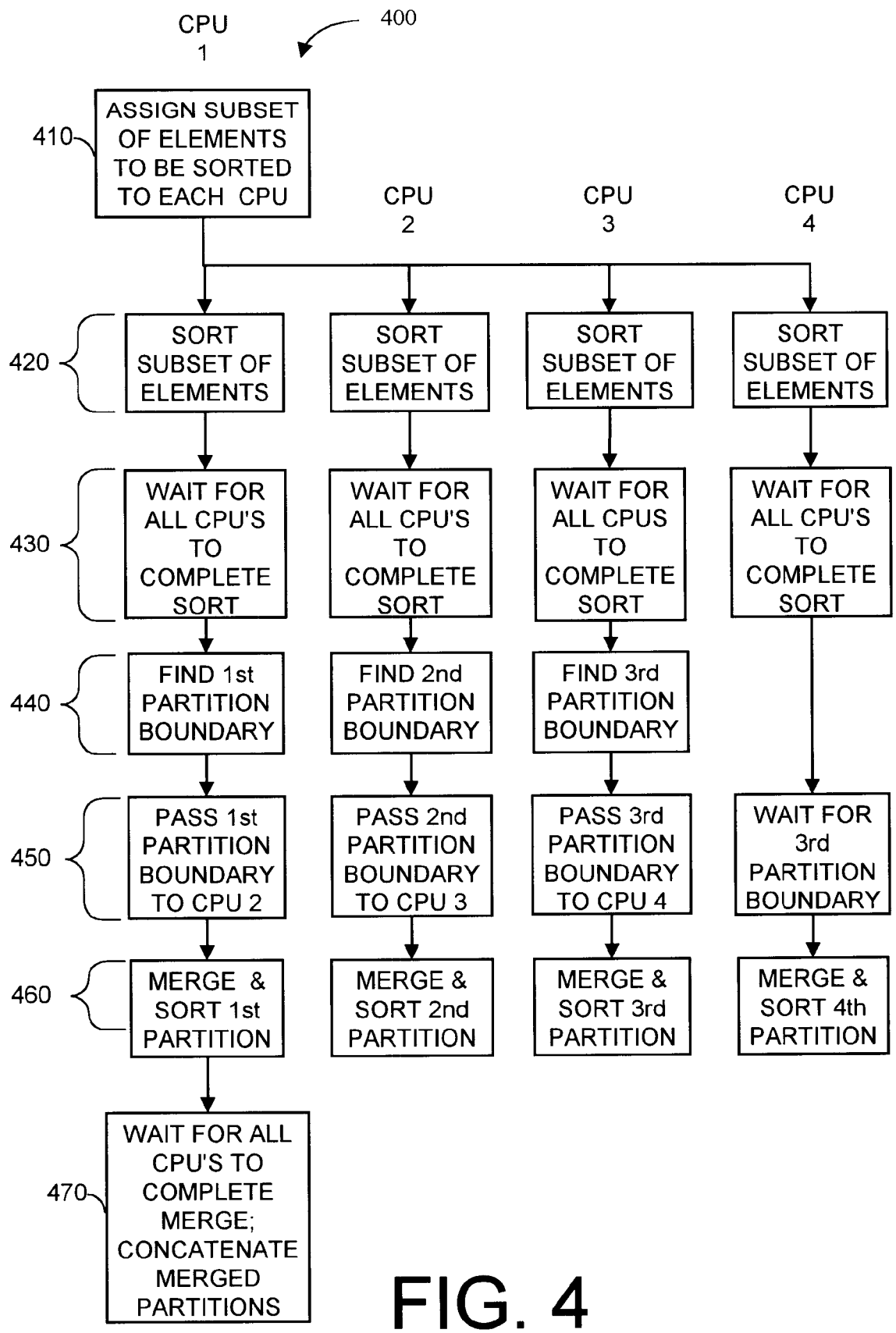
FIG. 4 is a flowchart depicting a method of sorting data using multiple processors in accordance with the preferred embodiment.

Referring now to FIG. 4, a flowchart depicting a method of sorting data using multiple processors according to a preferred embodiment is illustrated. Method 400 uses four processors to sort a list of "n" elements. However, the methods of the present invention work with any number of multiple processors, (2 or greater). In step 410, the list to be sorted is initially divided into 4 unique subset lists and each of the available processors is assigned one subset list. In step 420, each processor sorts the subset of elements assigned to it.

Referring now to FIG. 7, an example of four sorted lists according to the preferred embodiment are illustrated. In this example, the original list to be sorted contains 25 elements, which were divided among the available processors as follows. CPU 1 sorted the first 9 elements, CPU 2 sorted the next 8 elements, CPU 3 sorted the next 4 elements, and CPU 4 sorted the last 4 elements. FIG. 7 illustrates the resulting four pre-sorted subset lists after they have been lined up in a partition table format. Each column of the partition table is one of the pre-sorted subset lists and each "$n^{th}$" row of the partition table is an "$n^{th}$" element within each of the pre-sorted subset lists.

Referring back now to FIG. 4, in some cases, each CPU may not finish its sort processing at the same time as the others. Thus, in step 430, each CPU transmits a completion signal to CPU 1, which awaits completion signals from all processors before starting the partitioning process in step 440. The partition process of step 440 is performed by one less than the number of available processors, because the partition process draws boundary lines through the sorted lists. To create "n" partitions, only "n−1" boundary line need be drawn. Thus, in method 400 where there are four sorted lists, only 3 processors perform the partition process.

Each processor performing the partition procedure draws a boundary line. Before the partitioning can begin, each processor must be assigned a percentage of elements to be contained above and below its partition boundary line. In the preferred embodiment, the size of each partition is "n," the total number of elements, divided by "P," the number of processors, to create P nearly equally sized partitions containing approximately n/P elements each. It should be noted that there is no requirement that the partitions be equally sized. However, assigning unequal percentages so as to create unequally sized partitions does not make better use of a higher speed processor in the partitioning process, because each processor creates a partition boundary from the same "n" elements. That is, each processor has to process the same number of elements regardless of the size of the partitions. Thus, according to the preferred embodiment, nearly equally sized partitions are created.

Referring now to FIG. 8, an example of four partitions created from four sorted lists in accordance with the preferred embodiment is illustrated. 3 CPU's performed the partitioning process to create partition boundaries 810, 820, and 830. CPU 1 performed the partition process assigning approximately 25% of the 25 elements to its upper partition. CPU 2 performed the partition process assigning approximately 50% of the 25 elements to its upper partition. CPU 3 performed the partition process assigning approximately 75% of the 25 elements to its upper partition. By illustrating the 3 partition lines created by the 3 processors that performed the partition process, it should be noted that the four sorted lists are now also divided into four partitions. The methods of the present invention which draw boundary lines will be described in more detail following this description of the overall sort process.

Referring back to step 450 in FIG. 4, each processor signals completion of the partition procedure by passing the location of its partition boundary line to the next CPU. The "next" CPU is the CPU that determines the partition boundary line with the next higher percentage of elements in the upper partition. For instance upon completion of the partition process, CPU 1, which has found a partition boundary line with approximately 25% of the elements in its upper partition, passes the location of its partition boundary line to CPU 2, because CPU 2 has the next highest percentage of elements (approximately 50%) in its upper partition. By receiving the location of CPU 1's partition boundary line, CPU 2 now has the lower and upper limits of one partition. That is, CPU 2 determines the partition, which contains all elements below the partition boundary line passed to it by CPU 1, through and including the elements demarcated by the partition boundary line found by CPU 2.

In this manner, step 450 allows each CPU to identify all the elements contained in one partition. No information needs be passed to the CPU with the lowest percentage of elements assigned to it, because the upper limits of the first partition will be the upper limits of the partition table. For instance, since CPU 1 is assigned the lowest percentage of elements (approximately 25%), it knows that the first partition will include all elements from the partition table up to and including those demarcated by the partition boundary line it finds during the partition procedure.

A different situation occurs for determining the limits of the last partition. Since "P-1" processors were needed to draw "P-1" partition boundary lines to create P partitions, one processor does not perform the partition procedure. However, the processor that is idle during step 440 is passed the partition boundary line from the CPU assigned the highest percentage of elements in the upper partition. In this way, the idle CPU can also identify the limits of the last partition, which includes all the elements in the partition boundary table below the partition boundary line it receives. For instance, CPU 4 did not participate in step 440. However, CPU 3 passes CPU 4 the partition boundary line found by CPU 3. From that upper boundary, CPU 4 can determine the limits of the last partition. In this way, four partitions are created by 3 processors.

A partition boundary is identified by column numbers and row numbers in the partitioning table. As stated previously, each column in the partitioning table represents a pre-sorted subset list and each row represents an element within one of the pre-sorted subset lists. Referring again to FIG. 8, partition boundary line 810 may be identified as: list 1, row 6. This means that all elements above and including the 6th element in the first list are in the first partition. Note that since no elements from lists 2 through 4 are above partition boundary line 810, those columns do not identify partition boundary line 810, and thus no reference is made to them.

Partition boundary line 820 may be identified as list 1, row 7, list 2, row 4, and list 3, row 1. However, the second partition has the first partition as an upper boundary. CPU 2 receives partition boundary line 810 from CPU 1, and knows that only elements below partition boundary line 810 and above and including partition boundary line 820 are in the second partition. Thus, partition boundary line 820 is read in conjunction with partition boundary line 810 to identify the second partition, which includes the $7^{th}$ element in the first list, the $1^{st}$ through $4^{th}$ elements in the second list and the first element in the third list.

Partition boundary line 830 may be identified as list 1, row 7, list 2, row 4, list 3, row 4 and list 4, row 3. The third partition has the second partition as an upper boundary. CPU 3 receives partition boundary line 820 from CPU2, so it knows that only the elements below partition boundary line 820 and above and including partition boundary line 830 are in the third partition. Thus, partition boundary line 830 is read in conjunction with partition boundary line 820 to identify the third partition, which includes the $2^{nd}$ through $4^{th}$ elements in the third list and the $1^{st}$ through $3^{rd}$ elements in the fourth list. Finally, CPU 4 is passed partition boundary line 820, from which it can deduce that the fourth partition includes the $8^{th}$ and $9^{th}$ elements in the first list, the $5^{th}$ through $8^{th}$ elements in the second list and the $4^{th}$ element in the fourth list.

Referring back to FIG. 4, in step 460, once each of the P processors knows the limits of its partition, each processor then merges the elements in its partition and sorts them. Finally, in step 470, CPU 1 awaits a signal from each processor that it has completed the merge and sort process. Once all partitions have been merged and sorted, CPU 1 concatenates them into a sorted list of the "n" elements. It will be recognized by those skilled in the art that any one of the CPU's could be in charge of performing steps 410 and 470, and not necessarily CPU 1. Step 470 completes the multi-processor sort process. Using method 400, maximum use is made of available processors, such that there is a near linear improvement made in sort time with each additional processor added.

Figure 5:
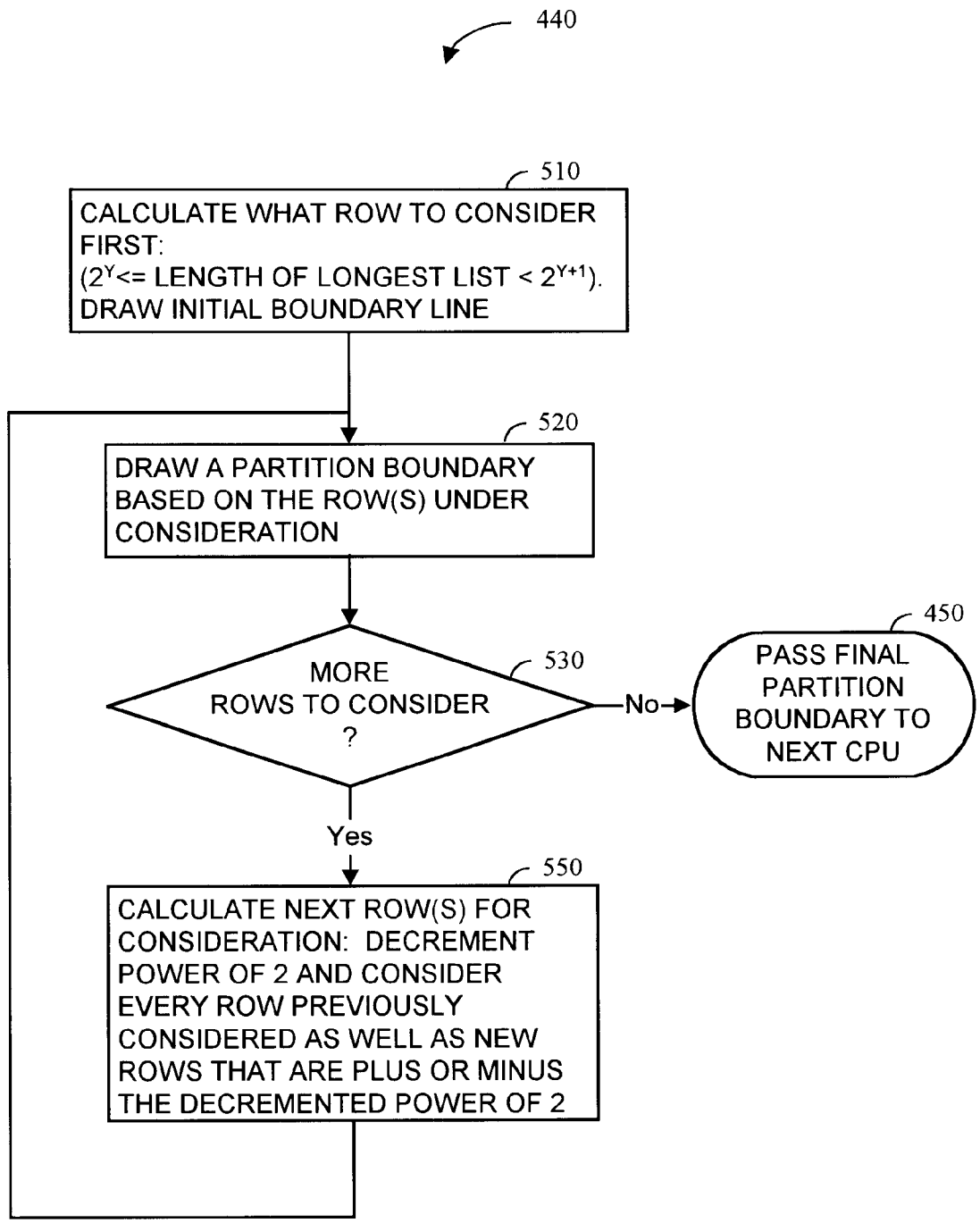
FIG. 5 is a flowchart depicting an iterative method of selecting rows of elements for consideration in drawing a partition boundary line according to the preferred embodiment.
Figure 6:
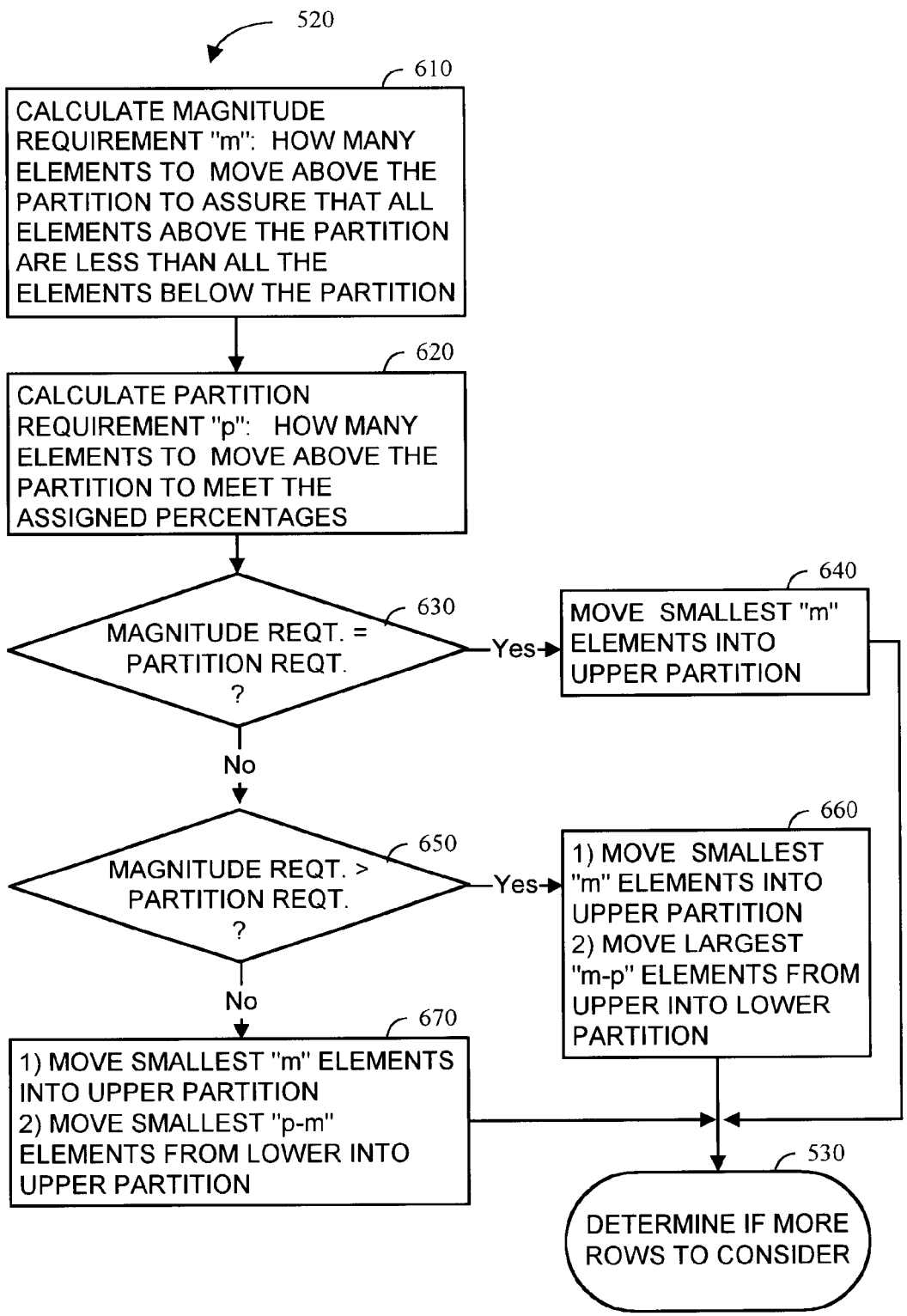
FIG. 6 is a flowchart depicting a method of drawing a partition boundary line in accordance with the preferred embodiment.

Referring now to FIG. 5, a flowchart depicting an iterative method of selecting rows of elements for consideration in drawing a partition boundary line according to a preferred embodiment is illustrated. Method 440 is a more detailed look at step 440 in FIG. 4, which requires more explanation in two ways. First, the preferred embodiment does not draw a partition boundary line through the entire partitioning table all at once. Instead, the preferred embodiment draws a series of boundary lines, first when considering only one row in the partitioning table, and subsequently when considering additional rows in the partitioning table. The procedure of drawing a series of partition boundary lines is explained by method 440 in FIG. 5. The second way in which step 440 in FIG. 4 needs further explanation involves how the preferred embodiment draws a partition boundary line. Referring now to FIG. 6, a flowchart depicting a method of drawing a partition boundary line in accordance with the preferred embodiment is illustrated. Method 520 in FIG. 6 explains how the partition boundary lines are drawn. Both method 440 in FIG. 5 and method 520 in FIG. 6 will be explained with reference to examples.

Referring back to FIG. 5, steps 520 through 550 are performed repetitively in method 440. Step 510 initializes the procedure. An initial row is chosen from the partitioning table as a starting point for drawing an initial boundary line. The first row to be considered is preferably determined based on the length of the sorted lists. The first row is preferably a power of 2 ($2^y$), such that: ($2^y$<=the number of elements in the longest pre-sorted subset list <$2^{y+1}$). Once the first row is chosen, an initial boundary line is drawn such that all the elements in the initial row are below the initial boundary line.

Figure 9:
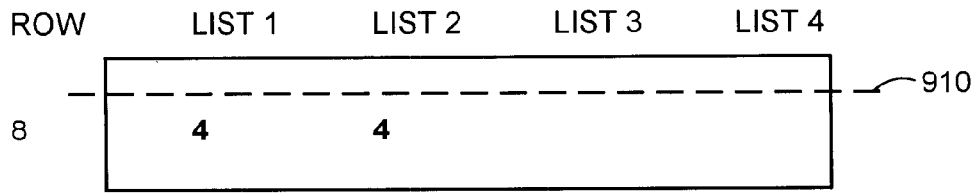
FIG. 9 illustrates an initial row under consideration in the partition process in accordance with the preferred embodiment.

Referring again to FIG. 7, list 1 is the longest pre-sorted subset list containing 9 elements. In this example, the first row for consideration will be a power of 2 such that: ($2^y$<=9<$2^{y+1}$). Thus, y=3, and since $2^3$=8, row 8 is calculated to be the first row for consideration using the example in FIG. 7. Referring now to FIG. 9, an initial row under consideration in the partition process in accordance with the preferred embodiment is illustrated. FIG. 9 shows row 8 as the initial row under consideration. All elements in initial row 8 are below initial boundary line 910.

Referring back to FIG. 5, the first iteration of step 520 redraws the initial boundary line upon considering the initial row. Referring again to FIG. 6, method 520 is a more detailed explanation of step 520 in FIG. 5. Method 520 illustrates how the preferred embodiment redraws a boundary line given the row or rows under consideration. In the first pass of method 520, only one row is under consideration.

Referring to FIG. 6, in step 610, a magnitude requirement, "m," is calculated. This calculation determines how many elements, "m," to move from below the boundary line to above the boundary line to assure that all elements above the partition are smaller than all the elements below the partition. During the first pass the magnitude requirement, "m," will always be zero, because as illustrated in FIG. 9, all elements from the initial row are below the partition boundary line. In future iterations of method 520, when there are elements above the line, the magnitude requirement calculation is more meaningful.

Referring back to step 620 in FIG. 6, the partition requirement, "p," is calculated to be the number of elements under consideration that must be above the partition boundary line to satisfy the assigned percentage. Each of the multiple CPU's performing method 520 are assigned a percentage of the total elements that should exist above the partition boundary. These percentages are used in the calculation of the partition requirement in each repetition of method 520. The calculation of the partition requirement preferably ignores fractional remainders.

Since the partitioning table illustrated in FIG. 7 contains four pre-sorted subset lists, the methods of the present invention create four near-equally sized partitions. Three CPU's draw three partition boundary lines to create 4 partitions: CPU 1 is assigned 25% as the percentage of elements above its partition line, and CPU's 2 and 3 are assigned 50% and 75% respectively. The present example traces the partition boundary line drawn by CPU 3, that is, 75% of the elements preferably exist above the partition boundary line drawn by method 520. Referring again to FIG. 9, only two elements are under consideration for the first pass of method 520, because pre-sorted subset lists 3 and 4 do not contain an element in the $8^{th}$ row. The partition requirement, "p," is calculated to be (75%)(2 elements)=1, ignoring the fractional remainder.

Referring back to FIG. 6, after calculating the magnitude requirement, "m," and the partition requirement, "p," step 630 asks if they are equal in value. In the present example, step 630=No, because m=0 and p=1. Step 650 asks if the magnitude requirement exceeds the partition requirement. Step 650=No, and so step 670 is performed. The first prong of step 670 moves the smallest "m" number of elements from below the lower partition to the upper partition. Since m=0, no elements are moved for the first prong of step 670. The second prong of step 670 moves the smallest "p−m" number of elements from the lower partition to the upper partition.

A critical point to understanding the methods of the present invention involves how the smallest element amongst multiple elements is determined. When there are no duplicate elements in any of the sorted lists, the determination is simply in accordance with the sort order. For example, if the four lists were sorted in increasing order, then the smaller element for the purposes of redrawing the partition boundary line is simply the element that sorts ahead of the others.

When there are duplicate entries in the original list of elements, however, a weight is given each of the duplicate elements under consideration in accordance with the methods of the present invention. In the preferred embodiment, the weight given each element depends upon the list number and row number of the element in the partitioning table. For example the element in the first list, first row is weighted 1,1, whereas the element in the second list, eighth row is weighted 2,8. In this way, the methods of the present invention can determine smaller and larger elements from amongst duplicate values.

In the preferred embodiment, list numbers are considered before row numbers. For example, the element in the first list, third row (1,3) is weighted less than the element in the third list, first row (3,1). What is meant by a list number being considered before a row number is that, for example in the weighting "3,1," the list number 3 is examined first in comparing two duplicate values. If one duplicate value is in list 1 and one is in list 3, the duplicate in list 1 weighs less because it has a lower list number. If both duplicate values are both in the same pre-sorted subset list, then the row number is considered. The duplicate value with the lower row number weighs less than one with a higher row number.

It should be noted that although the preferred embodiment considers list numbers before row numbers, the methods of the present invention will work even if row numbers are considered before list numbers. What matters to the methods of the present invention in assigning a weighting scale is that all the processors performing the partitioning process adopt the same weighting scale. When they do, any way which makes duplicate values unique will work to ensure that accurate boundary lines are drawn.

Step 670 determined that the smallest "p−m" elements from the lower partition must be moved to the upper partition to properly adjust the partition boundary line. Since p−m=1 in the present example, the smallest 1 element must be moved from lower partition to the upper partition. Referring again to FIG. 9, all of the elements in row 8 are preliminary candidates for this move, since both of these elements are directly below existing boundary line 910.

Figure 10:
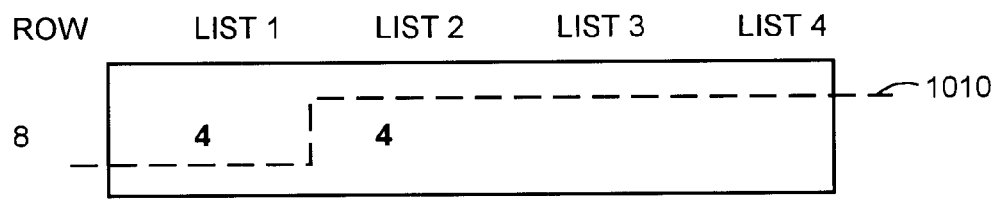
FIG. 10 illustrates a partition boundary line redrawn after considering only the elements in the initial row in accordance with the preferred embodiment.

First, these elements are weighted according to their sort order; however, since both elements are 4's, neither will sort before the other. Next, the 4's in row 8 are weighted according to the methods of the present invention. The 4 in list 1, row 8 is weighted 1,8 and the four in list 2, row 8 is weighted, 2,8. Purely as a matter of how the elements were divided amongst the processors and how they are pre-sorted into subset lists, the 4 in list 1 weights lower than the 4 in list 2. Thus, the 4 in list 1, row 8 is moved to the upper partition to satisfy step 670 in method 520. Referring now to FIG. 10, a partition boundary line redrawn after considering only the elements in the initial row in accordance with the preferred embodiment is illustrated. FIG. 10 shows partition boundary line 1010, which was redrawn after moving the element in list 1, row 8 into the upper partition in accordance with step 670 in method 520. After step 670, method 520 is complete and control transfers back to step 530 in FIG. 5.

Referring back to FIG. 5, step 530 asks if there are more rows to consider. If so, step 550 determines the new rows to be added for consideration in redrawing the partition boundary line. Step 550 selects new rows that are halfway between the previous rows selected. By adding the rows that are half way between previous rows each time that step 550 is performed, steps 520 through 550 are repeated until all the rows in the partitioning table have been selected.

In the preferred embodiment, the number of times that steps 520 through 550 are performed correlates to the power of 2 chosen when the initial row was selected. Each time that new rows are added, the power of 2 is decremented and the new rows to consider are determined by adding and subtracting the decremented power of 2. On the last pass, the power of 2 decrements to 0 ($2^0$=1), and all the odd rows are considered.

Figure 11:
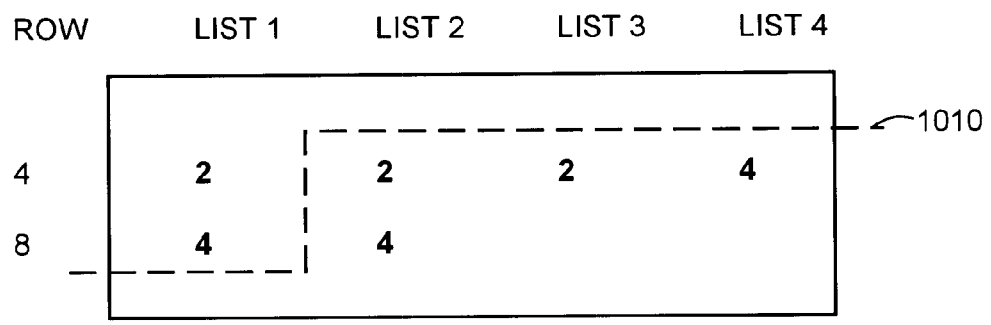
FIG. 11 illustrates an additional row under consideration in the partitioning process according to the preferred embodiment.

Referring now to FIG. 11, an additional row under consideration in the partitioning process in accordance to the preferred embodiment is illustrated. The initial row under consideration was row 8, which was determined from choosing $2^3$ in step 510. In step 550, the 3rd power of 2 is decremented to the 2nd power of 2 ($2^2$=4), and 4 is both added to and subtracted from the previously considered rows. In this case 8+4=12; however, there are no pre-sorted subset lists with 12 elements. 8−4=4 and so the 4th row is added for consideration by step 550.

It should be noted that when new rows are added for consideration, the elements in each new row must be added with respect to the previously existing boundary line. For instance the elements in row 4 should be added with respect to boundary line 1010 in FIG. 11. According to the preferred embodiment, partition boundary line 1010 is identified as list 1, row 8. No further identification is necessary because no elements in lists 2, 3, or 4, are above or included in the upper partition. However for the purposes of explaining how elements from new rows are added with respect to an existing partition boundary line, partition boundary line 1010 can be identified as list 1, row 8, list 2, row 0, list 3, row 0, and list 4, row 0. Now when adding elements from row 4, it is clear that the element in list 1, row 4 belongs in the upper partition, and that the elements from lists 2, 3, and 4, row 4 belong in the lower partition. As illustrated in FIG. 11, the elements in lists 2, 3, and 4, in row 4 are placed below partition boundary line 1010.

Once the elements from the newly added rows have been chosen for consideration, step 520 in FIG. 5 again redraws the partition boundary line with considering all the new elements. Referring again to FIG. 6, method 520 is repeated. In step 610, the magnitude requirement, "m," is calculated to be the number of elements to move to the upper partition to assure that all elements above the partition are less than all the elements in the lower partition. Examining partition boundary line 1010 in FIG. 11, it can be seen that because a value of 4 exists in the upper partition, the 2's in list 2, row 4, and list 3 row 4, need to be moved to the upper partition to satisfy the magnitude requirement. Thus, the magnitude requirement for this iteration of method 520 is 2.

The partition requirement "p," is calculated to be the number of elements to move above the partition to meet the 75% minimum assigned to CPU 3. Examining the elements currently under consideration in FIG. 11, (75%)(6 elements under consideration)=4 elements that must exist in the upper partition to satisfy the partition requirement. Currently, there are 2 elements above the partition, and so "p" must equal 2 to bring the total number of elements above the partition to 4.

Figure 12:
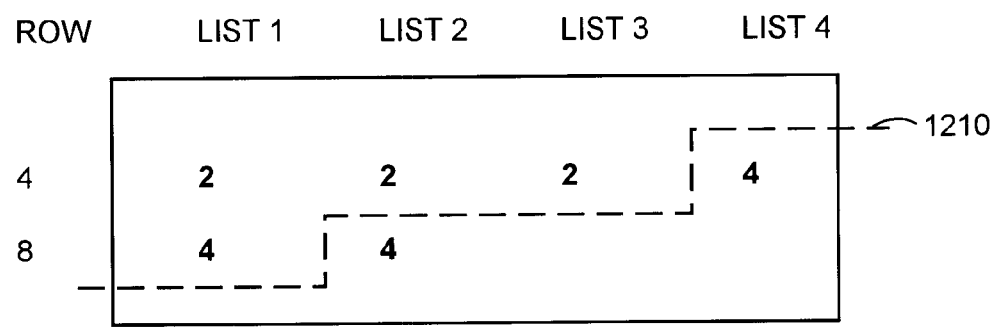
FIG. 12 illustrates how the partition boundary line is adjusted upon considering the additional row in accordance with the preferred embodiment.

Step 630 asks if the partition and magnitude requirements are equal. For this iteration of method 520, both "p" and "m"=2 (step 630=Yes). In step 640, the smallest "m" number of elements are moved to the upper partition. Examining the elements in FIG. 11 which border partition line 1010, it is easy to see that the two 2's in row four are the smallest two elements, because they sort before the other elements in the lower partition. Thus, both 2's in row 4 are moved to the upper partition and this iteration of method 520 is complete. Referring to FIG. 12, a partition boundary line redrawn after considering an additional row of elements in accordance with the methods of the present invention is illustrated. FIG. 12 shows redrawn partition boundary line 1210 after the two 2's have been moved into the upper partition.

At this point, method 520 is complete and control transfers back to step 530 in FIG. 5. Since there are still more rows to consider (step 530=Yes), step 550 again decrements the power of 2, this time to 1 ($2^1$=2). 2 is both added to and subtracted from the previously considered rows to determine what new rows to consider. In this case 4+2=6, 4−2=2, 8−2=6, and 8+2=10, however none of the lists contain a row 10, so the new rows to be considered are 2 and 6. Referring now to FIG. 13, the addition of two more rows for consideration in the partitioning process according to the preferred embodiment is illustrated.

Again it should be noted that when new rows are added for consideration, the elements in each new row must be added with respect to the previously existing boundary line. In the current example, partition boundary line 1210 can be identified as list 1, row 8, list 2, row 4, list 3, row 4, and list 4, row 0. When adding the elements from row 2, only the element in list 4, row 2 will be added below partition boundary line 1210. When adding the elements from row 6, only the element in list 2, row 6 will be added below partition boundary line 1210.

Once the elements in rows 2 and 6 have been properly placed with respect to partition boundary line 1210 as illustrated in FIG. 13, step 520 is repeated. Referring again to FIG. 6, method 520, step 610 calculates the magnitude requirement, "m," to be the number of elements to move to the upper partition to assure that all elements above the partition are less than all the elements in the lower partition. Examining partition boundary line 1210 in FIG. 13, it can be seen that because a 4 exists in the upper partition, the 2 in list 4, row 2 needs to be moved to the upper partition to satisfy the magnitude requirement. Thus, the magnitude requirement for this iteration of method 520 is 1.

The partition requirement "p," is calculated to be the number of elements to move above the partition to meet the 75% minimum assigned to CPU 3. Examining the elements currently under consideration in FIG. 13, (75%)(12 elements under consideration)=9 elements that must exist in the upper partition to satisfy the partition requirement. Currently, there are 8 elements above the partition, and so "p" must equal 1 to bring the total number of elements above the partition to nine.

Step 630 asks if the partition and magnitude requirements are equal. For this iteration of method 520, both "p" and "m"=1 (step 630=Yes). In step 640, the smallest "m" elements are moved to the upper partition. Examining the elements in FIG. 13 which are below the partition, it can be seen that the 2 in list 4 row 2 is smallest element, as it will sort prior to all the other elements in the lower partition. Thus, the 2 in list 4 row 2 is moved to the upper partition and this iteration of method 520 is complete. Referring now to FIG. 14, a redrawn partition boundary line upon considering the elements in the additional rows in accordance with the preferred embodiment is illustrated. FIG. 14 shows partition boundary line 1410 after the 2 in list 4, row 2 has been moved to the upper partition.

Referring back to FIG. 5, at this point there are still more rows to consider (step 530=Yes). In step 550, the power of 2 is again decremented, this time to 0 ($2^0$=1). 1 is both added to and subtracted from the previously considered row to determine what new rows to consider. In this case both adding 1 to all the existing rows and subtracting 1 from all the existing rows effectively adds all remaining rows.

Once more, it should be noted that when new rows are added for consideration, the elements in each new row must be added with respect to the previously existing boundary line. Referring now to FIG. 15, the addition of all remaining rows for consideration in the partitioning process in accordance with the preferred embodiment is illustrated. In the current example, rows 1, 3, 5, 7, and 9, must be added with respect to boundary line 1410, which can be identified as list 1, row 8, list 2, row 4, list 3, row 4, and list 4, row 2. All elements in row 1 are properly placed in the upper partition. The elements in row 3 are placed in the upper partition except for the element in list 4, which is placed in the lower partition. The element in list 1, row 5 is placed in the upper partition, while the element in list 2, row 5 is placed in the lower partition. The same is true for the elements in row 7. The only element in row 9 is placed in the lower partition.

Once the new rows have properly been added with respect to partition boundary line 1410, step 520 in method 440, the process of drawing a boundary line based on the elements under consideration is repeated; this time using all the rows in the partitioning table. Referring again to FIG. 6, step 610, the magnitude requirement, "m," is calculated to be the number of elements to move to the upper partition to assure that all elements above the partition are less than all the elements in the lower partition. Examining partition boundary line 1410 in FIG. 15, it can be seen that since there is a 4 in the upper partition, the 2 in list 4 row 3 needs to be moved to the upper partition to satisfy the magnitude requirement. Thus, the magnitude requirement for this iteration of method 520 is 1.

The partition requirement "p," is calculated to be the number of elements to move above the partition to meet the 75% minimum assigned to CPU 3. Examining the elements currently under consideration in FIG. 15, (75%)(25 elements under consideration)=18 elements that must exist in the upper partition to satisfy the partition requirement. Currently, there are 18 elements above the partition, and so "p" must equal zero to keep the number of elements above the partition at 18.

Step 630 asks if the partition and magnitude requirements are equal. For this iteration of method 520, m=1 and p=0 (step 630=No). Step 650 then asks if m>p, which is the case for this iteration of method 520 (step 650=Yes). Step 660 first moves the smallest "m" elements into the upper partition. Examining the elements directly below boundary line 1410 in FIG. 15, the 2 in list 4, row 3 sorts prior to all the remaining elements in the lower partition. Thus, the 2 in list 4, row 3 is moved into the upper partition.

The second prong of step 660 moves the largest "m–p" elements into the lower partition. In this case m–p=1–0=1. The elements directly above partition line 1410 are candidates for this move, remembering that the 2 in list 4, row 3 now exists in the upper partition. The 4 in list 1, row 8 is the largest element in the upper partition, because it will sort before all the rest of the elements in the upper partition. Thus, the 4 in list 1, row 8 is moved into the lower partition according to step 660, and method 520 is complete. Referring now to FIG. 16, the final partition boundary line in accordance with the preferred embodiment is illustrated. Partition boundary line 830 reflects the elements moved in step 660, and is the final boundary line drawn in the partitioning process performed by CPU 3, because all the rows in the partitioning table have been considered in drawing this line.

Referring back to FIG. 5, since there are no more rows to consider (step 530=No), method 440 is complete. It should be noted that partition boundary line 830 in FIG. 16 is the same boundary line 830 illustrated in FIG. 8. The previous discussion of method 440 showed how partition boundaries are drawn in iterations, drawing a line first by considering only one row of elements, and then redrawing the line after adding more rows of elements. In general, the partition boundary lines are redrawn by examining how the previous boundary line must be adjusted to be a proper boundary line after the addition of the new elements under consideration.

Method 440 is also used to create partition boundary lines 810 and 820. The only difference in how method 440 draws the partition lines is dependent upon the percentage of elements assigned to each processor performing method 440. In order to create partition boundary line 830, 75% of the elements were to be assigned to the upper partition. To draw partition boundary line 810, 25% of the elements must be assigned to the upper partition. And to draw partition boundary line 820, 50% of the elements must be assigned to the upper partition.

The methods of the present invention are now explained with a further example of drawing partition boundary lines in accordance with the preferred embodiment. Using the same four sorted lists, the iterations of method 520 required by CPU 1 to create boundary line 810 in FIG. 8 will be explained. CPU 1 is performing the same process, with the exception of being assigned a different percentage of elements above its partition boundary line. Referring again to FIG. 9, it should be noted that like CPU 3, CPU 1 will start by considering row 8. Two elements are under consideration for the first pass of method 520. Since no elements exist above initial boundary line 910, the magnitude requirement, "m," is calculated to be zero. The partition requirement, "p," is calculated to be 0 as well, because (25%)(2 elements)=0. The calculation of the partition requirement ignores fractional remainders.

Referring back to FIG. 6, after the calculation of the magnitude and partition requirements, step 630 asks if they are equal in value. Considering the elements in row 8 only, as shown in FIG. 9, step 630 asks if the partition and magnitude requirements are equal. For this iteration of method 520, both "p" and "m"=0 (step 630=Yes). In step 640, the smallest "m" number of elements are moved to the upper partition. However, since m=0, no elements are moved. Method 520 is complete with no change in boundary line 910, as can still be illustrated in FIG. 9.

Referring now to FIG. 17, an additional row under consideration by another processor performing the partitioning process according the preferred embodiment is illustrated. Method 520 is invoked a second time after row 4 is added for consideration, as illustrated in FIG. 17. In step 610, the magnitude requirement, "m," is calculated to be the number of elements to move to the upper partition to assure that all elements above the partition are less than all the elements in the lower partition. Since no elements exist above partition boundary line 910, m=0.

The partition requirement "p," is calculated to be the number of elements to move above the partition to meet the 25% minimum assigned to CPU 1. Examining the elements currently under consideration in FIG. 17, (25%)(6 elements)=1 element that must exist in the upper partition to satisfy the partition requirement. Currently, there are no elements above the partition, and so "p" must equal 1 to bring the total number of elements above the partition to one. Step 630 asks if m=p. For this iteration of method 520, m=0 and p=1 (step 630=No). Since m is less than p (step 650=No), step 670 is performed.

The first prong of step 670 moves the smallest "m" elements into the upper partition. However, since m=0, no elements are moved. The second prong of step 670 moves the smallest "p–m" elements from the lower to the upper partition. Examining the elements in FIG. 17 that border boundary line 910, the elements in row 4 are candidates to be moved into the upper partition. First these elements are weighted according to their sort order. The three 2's sort before the 4, and so the 4 is eliminated as a candidate for the smallest elements. Since there are duplicate entries in the original list of elements, a weight given each of the duplicate elements under consideration. The weight given each element is dependent upon the list and row in which the element is contained. The 2 in list 1, row 4 is weighted 1,4, the 2 in list 2, row 4 is weighted, 2,4, and the 2 in list 3, row 4 is weighted 3,4.

Purely as a matter of how the elements were divided amongst the processors and pre-sorted into subset lists, the 2 in list 1, row 4 weighs less than the 2's in either list 2, row 4, or list 3, row 4. Thus, the 2 in list 1, row 4 is considered the smallest element and moved to the upper partition. Referring now to FIG. 18, a redrawn partition boundary line upon considering the additional row in accordance with the preferred embodiment is illustrated. Boundary line 1810 reflects the movement of the 2 in list 1, row 4 to the upper partition. Once boundary line 1810 has been adjusted as shown, method 520 is complete.

Referring now to FIG. 19, two additional rows for consideration in the partitioning process in accordance with the preferred embodiment is illustrated. FIG. 19 shows boundary line 1810 after rows 2 and 6 are added for consideration. Referring back to FIG. 6, method 520 is repeated with these new rows under consideration. In step 610, the magnitude requirement, "m," is calculated to be the number of elements to move to the upper partition to assure that all elements above the partition are less than all the elements in the lower partition. Examining partition boundary line 1810 in FIG. 19, it can be seen that there are many 2's in both the lower and upper partitions. This is significant because the 2's in the upper partition are the largest elements according to sort order and the 2's in the lower partition are the smallest elements according to sort order.

In this situation, an analysis needs be done to determine if any of the 2's in the lower partition need be moved into the upper partition to satisfy the magnitude element. It should be remembered that list numbers weigh more than row numbers, and thus the 2's in list 1, no matter which row they are in, will weigh less than the 2's in lists 2, 3, and 4. In this case, the upper partition contains elements only from list 1, so all the 2's in lists 2, 3, and 4 will weigh more than all the elements in the upper partition. Additionally, the only 2 in list 1 that is below the boundary line weighs more than both the 2's in list 1 above the boundary line, because of its row number. Thus there exists no elements in the lower partition which weigh more than any of the elements in the upper partition and for this iteration of method 520, m=0.

The partition requirement "p," is calculated to be the number of elements to move above the partition to meet the 25% minimum assigned to CPU 1. Examining the elements currently under consideration in FIG. 19, (25%)(12 elements under consideration)=3 elements that must exist in the upper partition to satisfy the partition requirement. Currently, there are 2 elements above the partition, and so "p" must equal 1 to bring the total number of elements above the partition to three.

Step 630 asks if the partition and magnitude requirements are equal. For this iteration of method 520, m is less than p (step 630=No and step 650=No). Step 670 first moves the smallest m elements, but since m=0, no elements are moved. Next, step 670 moves the smallest "p−m" number of elements into the upper partition. Since p−m=1, the smallest element directly below boundary line 1810 is moved into the upper partition. Using the methods of the present invention, all of the 2's beneath boundary line 1810 are candidates for the move. Thus, the 2's must be weighted according to their list and row placement. The 2 in list 1, row 6 is weighted 1,6; the 2 in list 2 row 2 is weighted 2,2; the two in list 3, row 2 is weighted 3,2 and the 2 in list 4, row 2 is weighted 4,2. Thus, it can be seen that the 2 in list 1, row 6 weighs the least and it is moved to the upper partition.

Referring now to FIG. 20, a redrawn partition boundary line upon consideration of additional rows in accordance with the preferred embodiment is illustrated. FIG. 20 shows redrawn partition boundary line 810. At this point, method 520 is invoked a fourth and last time after rows 1, 3, 5, 7 and 9 are added for consideration. Referring now to FIG. 21, the final partition boundary line upon considering all rows in the partitioning table according to the preferred embodiment is illustrated. FIG. 21 shows boundary line 810 after rows 1, 3, 5, 7, and 9 have been added.

In step 610 of method 520, the magnitude requirement, "m," is calculated to be the number of elements to move to the upper partition to assure that all elements above the partition are less than all the elements in the lower partition. Examining partition boundary line 810 in FIG. 21, it can be seen that 2's exist in both the upper and lower partitions. This is significant because the 2's in the upper partition are the largest elements according to sort order and the 2's in the lower partition are the smallest elements according to sort order. Thus, an analysis needs be done to determine if any of the 2's in the lower partition need be moved into the upper partition to satisfy the magnitude element.

According to the methods of the present invention, each entry is weighted according to list first and then row second. Thus, all elements in list 2 are weighted more than the elements in list 1. By examining all the 2's in both partitions in FIG. 21, the 2's in lists 2, 3, and 4, weigh more than the 2's in list 1. Further the only 2 in list 1 that is also in the lower partition is the 2 in list 1, row 7. However, since all the 2's in the upper partition are also in list 1, the 2 in list 1 row 7 will weigh more due to its higher row number. Thus the magnitude requirement for this iteration of method 520 is 0.

The partition requirement "p," is calculated to be the number of elements to move above the partition to meet the 25% minimum assigned to CPU 3. Examining the elements currently under consideration in FIG. 21, (25%)(25 elements under consideration)=6 elements that must exist in the upper partition to satisfy the partition requirement. Currently, there are 6 elements above the partition, and so "p" must equal zero to keep the number of elements above the partition at six.

Step 630 asks if the partition and magnitude requirements are equal. For this iteration of method 520, m and p both equal zero, to step 640 is performed. Step 640 moves the smallest "m" elements, but since m=0 for this iteration of method 520, no elements are moved. Thus, FIG. 21 still accurately depicts the location of the partition boundary line at the completion of the final iteration of method 520. In fact, boundary line 810 is the final partition boundary line, which is the same partition boundary line as illustrated on FIG. 8.

In summary, the methods of the present invention provide a means to partition pre-sorted lists of elements containing duplicates, in a manner which treats duplicate elements uniquely. According to the preferred embodiment, a list of elements to be sorted is split amongst available processors. Each processor pre-sorts its subset list of elements into one or more pre-sorted subset lists. The resulting lists are lined up together to form columns of a partitioning table. The elements in each pre-sorted subset list form the rows of the partitioning table.

Duplicate elements are weighted according to their unique position in the partitioning table. All processors perform the same partitioning procedure on the same partitioning table. However, in the preferred embodiment, each processor draws a different partition boundary line based on a different assigned percentage of elements that should exist above the partition boundary line.

When multiple processors draw different partition boundary lines through the partitioning table, each processor treats duplicate entries in the partitioning table as unique entries in the table. When having to decide which in a set of duplicates should reside in the upper partition, the methods of the present invention allow each of the multiple processors to make the decision as though the duplicate entries were not duplicates. As a result, none of the partition boundary lines will cross due to inconsistent handling of duplicate entries during the partitioning process.

The partitions are produced such that each element in one partition has a value no smaller than any element in the partition before it, nor larger than any element in the partition following it. With respect to duplicate entries, the partitions are produced such that each element in one partition weighs more than any element in the partition before it, and weighs less than any element in the partition following it.

After partitioning the table, each available processor merges a partition and re-sorts the elements within that partition. Finally, all the merged and sorted partitions can be concatenated to produce one sorted list of all the elements. While the invention has been particularly shown and described with reference to preferred embodiments thereof, it will be understood by those skilled in the art that various changes in form and details may be made therein without departing from the spirit and scope of the invention.

What is claimed is:

1. An apparatus for partitioning multiple pre-sorted lists comprising:
    at least one processor;
    at least one memory coupled to said at least one processor, said at least one memory including a plurality of elements split into a plurality of lists and pre-sorted into a plurality of pre-sorted lists; and
    a multi-processor sort application residing in the at least one memory, said multi-processor sort application weighting elements by data value and further uniquely weighting by position value duplicate elements with respect to each other in said plurality of elements and partitioning said plurality of pre-sorted lists based on weighting criteria and partition size criteria, such that said plurality of partitioned pre-sorted lists can be merged, re-sorted, and concatenated together into one sorted list including all elements in said plurality of elements.

2. The apparatus of claim 1 wherein said multi-processor sort application creates a plurality of ordered partitions, each ordered partition in said plurality of ordered partitions including elements that
    sort before any non-duplicate elements in any of said plurality of ordered partitions that follow said each ordered partition,
    weigh less than any duplicate elements in any of said plurality of ordered partitions that follow said each ordered partition,
    sort after any non-duplicate elements in any of said plurality of ordered partitions that precede said each ordered partition, and
    weigh more than any duplicate elements in any of said plurality of ordered partitions that precede said each ordered partition.

3. The apparatus of claim 1 wherein each of said duplicate elements in said plurality of elements is weighted uniquely according to which position said each of said duplicate elements occupy among said plurality of pre-sorted and according to what position said each of said duplicate elements occupies within one of said plurality of pre-sorted lists.

4. The apparatus of claim 3 wherein each of said duplicate elements in said plurality of elements is weighted uniquely first according to which position said each of said duplicate elements occupy among said plurality of pre-sorted lists and second according to what position said each of said duplicate elements occupies within one of said plurality of pre-sorted lists.

5. The apparatus of claim 3 wherein each of said duplicate elements in said plurality of elements is weighted uniquely first according to what position said each of said duplicate elements occupies within one of said plurality of pre-sorted lists, and second according to which position said each of said duplicate elements occupy among said plurality of pre-sorted lists.

6. The apparatus of claim 1 wherein each of said duplicate elements in said plurality of elements is weighted uniquely according to what column and row that said each of said duplicate elements occupies in a partitioning table.

7. The apparatus of claim 6 wherein each of said columns of said partitioning table comprises one of said plurality of pre-sorted lists and each of said rows of said partitioning table comprises at least one element from at least one of said plurality of pre-sorted lists.

8. An apparatus for partitioning multiple pre-sorted lists of elements comprising:
    least one processor;
    at least one memory coupled to said at least one processor; said at least one memory including a plurality elements including at least one set of duplicate elements, said plurality of elements divided into a plurality of lists and pre-sorted into a plurality of pre-sorted lists; and
    a multi-processor sort application residing in said at least one memory, said multi-processor sort application uniquely weighting each duplicate element in said at least one set of duplicate elements, and partitioning said plurality of pre-sorted lists into a plurality of ordered partitions, such that said plurality of ordered partitions can be merged, re-sorted, and concatenated into one sorted list of elements, each ordered partition in said plurality of ordered partition including elements that
    sort before any non-duplicate elements in any of said plurality of ordered partitions that follow said each ordered partition,
    weigh less than any duplicate elements in any of said plurality of ordered partitions that follow said each ordered partition,
    sort after any non-duplicate elements in any of said plurality of ordered partitions that precede said each ordered partition, and
    weigh more than any duplicate elements in any of said plurality of ordered partitions that precede said each ordered partition.

9. The apparatus of claim 8 wherein each of said at least one set of duplicate elements is weighted uniquely:

first according to which one of said plurality of pre-sorted lists that said each of said duplicate elements exists; and second according to what position said each of said duplicate elements occupies within said one of said plurality of pre-sorted lists.

10. The apparatus of claim 8 wherein each of said at least one set of duplicate elements is weighted uniquely:

first according to what position each of said duplicate elements occupies within said one of said plurality of pre-sorted lists; and second according to which one of said plurality of pre-sorted lists that said each of said duplicate elements exists.

11. A method of partitioning a plurality of elements comprising the steps of:

a) pre-sorting said plurality of elements into a plurality of pre-sorted lists;

b) uniquely weighting each element in each group of duplicate elements with respect to other said duplicate elements in each said group of duplicate elements in said plurality of elements;

c) weighting each non-duplicate element in said plurality of elements by data value; and d) partitioning said plurality of pre-sorted lists into an upper partition and a lower partition, said upper partition having a predetermined percentage of elements from said plurality of elements, and such that any element in said group of duplicate elements in said upper partition weighs less than any element in said group of duplicate elements in said lower partition and weighs less than any said non-duplicate element in said lower partition.

12. The method of claim 11 wherein the step of partitioning said plurality of elements into an upper and lower partition comprises partitioning said plurality of elements such that:

each element in said upper partition sorts before elements in said lower partition that do not duplicate said each element in said upper partition;

each element in said upper partition weighs less than elements in said lower partition that duplicate said each element in said upper partition;

each element in said lower partition sorts after elements in said upper partition that do not duplicate said each element in said lower partition; and each element in said lower partition weighs more than elements in said upper partition that duplicate said each element in said lower partition.

13. The method of claim 11 wherein the step of partitioning said plurality of elements into an upper partition and a lower partition comprises the step of drawing a partition boundary line through said plurality of pre-sorted lists such that a predetermined percentage of said elements in said plurality of elements exists in said upper partition.

14. The method of claim 11 wherein the step of uniquely weighting elements in said plurality of elements having duplicate values comprises creating a partition table from said plurality of pre-sorted lists, assigning a row and column number to each element in said partition table, and weighting said duplicate elements with respect to each other in said partition table according to said row and column numbers and globally weighting said non-duplicate elements according to the data value of the element.

15. The method of claim 11 wherein the step of partitioning said plurality of elements into an upper partition and a lower partition comprises the steps of:

a) calculating a magnitude requirement, said magnitude requirement equaling a number of elements that must be moved from said lower partition to said upper partition in order for all non-duplicate elements in said upper partition to sort before non-duplicate elements in said lower partition and for duplicate elements in said upper partition to weigh less than duplicate elements in said lower partition;

b) calculating a partition requirement, said partition requirement equaling a number of elements that must be moved from said lower partition to said upper partition, or from said upper partition to said lower partition, in order for said predetermined percentage of elements to exist in said upper partition; and c) moving elements between said upper and lower partitions, when moving any of said elements complies with said magnitude requirement and said partition requirement.

16. The method of claim 15 wherein the step of moving elements between said upper and lower partitions comprises:

a) moving a number of elements equal to said magnitude requirement from said lower partition to said upper partition, such elements sorting first amongst all elements in said lower partition, and if there are duplicate elements that sort first to be chosen from in moving said number of elements equal to said magnitude requirement, moving duplicate elements that weigh less than other duplicate elements in said lower partition;

b) moving a number of elements equal to the difference between said magnitude requirement and said partition requirement from said upper partition to said lower partition, if said magnitude requirement exceeds said partition requirement, such elements sorting last amongst all elements in said upper partition and if there are duplicate elements that sort last to be chosen from in moving said number of elements equal to the difference between said magnitude requirement and said partition requirement from said upper partition to said lower partition, moving duplicate elements that weigh more than other duplicate elements in said upper partition; and c) moving a number of elements equal to the difference between said partition requirement and said magnitude requirement from said lower partition to said upper partition, if said partition requirement exceeds said magnitude requirement, such elements sorting first amongst all elements in said lower partition and if there are duplicate elements that sort first to be chosen from in moving said number of elements equal to the difference between said partition requirement and said magnitude requirement from said lower partition to said upper partition, moving duplicate elements that weigh less than other duplicate elements in said lower partition.

17. A method of partitioning a plurality of pre-sorted elements comprising the steps of:

a) obtaining a fraction of said plurality of pre-sorted elements to assign to an upper partition;

b) obtaining at least one element to be under consideration from said plurality of pre-sorted elements;

c) partitioning said at least one element under consideration into an upper partition and a lower partition, such that said upper partition includes said fraction of said at least one element under consideration, and such that each element in said upper partition sorts before any element in said lower partition that is not a duplicate of said each element in said upper partition, each element in said upper partition weighs less than any element in said lower partition that is a duplicate of said each element in said upper partition, each element in said lower partition sorts after any element in said upper partition that is not a duplicate of said each element in said lower partition, and each element in said lower partition weighs more than any element in said upper partition that is a duplicate of said each element in said lower partition;

d) obtaining at least one additional element to be under consideration from said plurality of pre-sorted elements; and e) repeating steps c) and d) until all elements from said plurality of pre-sorted elements have been considered in partitioning said plurality of pre-sorted elements.

18. The method of claim 17 wherein the step of obtaining at least one element to be under consideration from said plurality of pre-sorted elements comprises obtaining at least one element from an initial row of elements in a partitioning table comprised of said plurality of pre-sorted elements.

19. The method of claim 17 wherein the step of partitioning said at least one element under consideration into an upper partition and a lower partition, such that said upper partition includes said fraction of said at least one element under consideration comprises the steps of:

a) calculating a magnitude requirement, said magnitude requirement equaling a number of said at least one element under consideration that must be moved from said lower partition to said upper partition in order for all of said at least one element under consideration in said upper partition to sort before non-duplicate elements in said lower partition and weigh less than duplicate elements in said lower partition;

b) calculating a partition requirement, said partition requirement equaling a number of said at least one element under consideration that must be moved from said lower partition to said upper partition, or from said upper partition to said lower partition, in order for said fraction of elements under consideration to exist in said upper partition; and c) moving said at least one element under consideration between said upper and lower partitions, when moving any of said at least one element under consideration complies with said magnitude requirement and said partition requirement.

20. The method of claim 19 wherein the step of moving said at least one element under consideration between said upper and lower partitions comprises:

a) moving a number of elements equal to said magnitude requirement from said lower partition to said upper partition, such elements sorting first amongst all elements in said lower partition, and if there are duplicate elements that sort first to be chosen from in moving said number of elements equal to said magnitude requirement, moving duplicate elements that weigh less than other duplicate elements in said lower partition;

b) moving a number of elements equal to the difference between said magnitude requirement and said partition requirement from said upper partition to said lower partition, if said magnitude requirement exceeds said partition requirement, such elements sorting last amongst all elements in said upper partition and if there are duplicate elements that sort last to be chosen from in moving said number of elements equal to the difference between said magnitude requirement and said partition requirement from said upper partition to said lower partition, moving duplicate elements that weigh more than other duplicate elements in said upper partition; and c) moving a number of elements equal to the difference between said partition requirement and said magnitude requirement from said lower partition to said upper partition, if said partition requirement exceeds said magnitude requirement, such elements sorting first amongst all elements in said lower partition and if there are duplicate elements that sort first to be chosen from in moving said number of elements equal to the difference between said partition requirement and said magnitude requirement from said lower partition to said upper partition, moving duplicate elements that weigh less than other duplicate elements in said lower partition.

21. A program product comprising:

a multi-processor sort application operating on data elements in a plurality of pre-sorted lists, uniquely weighting non-duplicate elements based on data value and further weighting any duplicate elements with respect to each other based on position value among and/or within in said pre-sorted lists and partitioning said plurality of pre-sorted lists based on weighting criteria and partition size criteria, such that said plurality of partitioned pre-sorted lists can be merged, re-sorted, and concatenated together into one sorted list including all elements in said plurality of elements; and signal bearing media bearing said multi-processor sort application.

22. The program product of claim 21 wherein the signal bearing media comprises transmission media.

23. The program product of claim 21 wherein the signal bearing media comprises recordable media.

24. The program product of claim 21 wherein said multi-processor sort application creates a plurality of ordered partitions, each ordered partition in said plurality of ordered partitions including elements that sort before any non-duplicate elements in any of said plurality of ordered partitions that follow said each ordered partition, weigh less than any duplicate elements in any of said plurality of ordered partitions that follow said each ordered partition, sort after any non-duplicate elements in any of said plurality of ordered partitions that precede said each ordered partition, and weigh more than any duplicate elements in any of said plurality of ordered partitions that precede said each ordered partition.

25. The program product of claim 21 wherein each of said duplicate elements in said plurality of elements is weighted uniquely according to which position each of said duplicate elements occupies among said plurality of pre-sorted lists and according to what position said each of said duplicate elements occupies within one of said plurality of pre-sorted lists.

26. The program product of claim 25 wherein each of said duplicate elements in said plurality of elements is weighted uniquely first according to which position each of said duplicate elements occupies among said plurality of pre-sorted lists and second according to what position said each of said duplicate elements occupies within one of said plurality of pre-sorted lists.

27. The program product of claim 25 wherein each of said duplicate elements in said plurality of elements is weighted uniquely first according to what position said each of said duplicate elements occupies in one of said plurality of pre-sorted lists, and second according to which position each of said duplicate elements occupies among said plurality of pre-sorted lists.

28. The program product of claim 21 wherein each of said duplicate elements in said plurality of elements is weighted uniquely according to what column and row that said each of said duplicate elements occupies in a partitioning table.

29. The program product of claim 28 wherein each of said columns of said partitioning table comprises one of said plurality of pre-sorted lists and each of said rows of said partitioning table comprises at least one element from at least one of said plurality of pre-sorted lists.

30. A program product comprising:
   a multi-processor sort application operating on data elements in a plurality of pre-sorted lists, said multi-processor sort application uniquely weighting non-duplicate elements based on data value and further weighting each duplicate element in at least one set of duplicate elements with respect to each other based on position value among and/or within said pre-sorted lists, and partitioning said plurality of pre-sorted lists based on weighting criteria and partition size criteria into a plurality of ordered partitions, such that said plurality of ordered partitions can be merged, re-sorted, and concatenated into one sorted list of elements, each ordered partition in said plurality of ordered partition including elements that
      sort before any non-duplicate elements in any of said plurality of ordered partitions that follow said each ordered partition,
      weigh less than any duplicate elements in any of said plurality of ordered partitions that follow said each ordered partition,
      sort after any non-duplicate elements in any of said plurality of ordered partitions that precede said each ordered partition, and
      weigh more than any duplicate elements in any of said plurality of ordered partitions that precede said each ordered partition; and
   signal bearing media bearing the at least one signal provider.

31. The program product of claim 30 wherein the signal bearing media comprises transmission media.

32. The program product of claim 30 wherein the signal bearing media comprises recordable media.

33. The program product of claim 30 wherein each of said at least one set of duplicate elements is weighted uniquely:
   first according to which position each of said duplicate elements occupy among said plurality of pre-sorted lists; and
   second according to what position said each of said duplicate elements occupies within said one of said plurality of pre-sorted lists.

34. The program product of claim 30 wherein each of said at least one set of duplicate elements is weighted uniquely:
   first according to what position each of said duplicate elements occupies within said one of said plurality of pre-sorted lists; and
   second according to which position each of said duplicate elements occupies among said plurality of pre-sorted lists.

* * * * *